(12) United States Patent
Xie et al.

(10) Patent No.: US 7,996,591 B2
(45) Date of Patent: *Aug. 9, 2011

(54) COMPUTING DEVICE WITH FLEXIBLY CONFIGURABLE EXPANSION SLOTS AND METHOD OF OPERATION

(75) Inventors: Yaoqiang (George) Xie, North York (CA); Roumen Saltchev, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/427,427

(22) Filed: Apr. 21, 2009

(65) Prior Publication Data
US 2009/0204736 A1    Aug. 13, 2009

Related U.S. Application Data

(63) Continuation of application No. 11/140,040, filed on May 27, 2005, now Pat. No. 7,539,801.

(51) Int. Cl.
*G06F 13/00* (2006.01)
(52) U.S. Cl. ........................ 710/104; 710/301
(58) Field of Classification Search .............. 710/104, 710/300–302
See application file for complete search history.

(56) References Cited

U.S. PATENT DOCUMENTS

| | | | |
|---|---|---|---|
| 6,035,355 A | 3/2000 | Kelley et al. | |
| 7,099,969 B2 | 8/2006 | McAfee et al. | |
| 7,174,412 B2 * | 2/2007 | Lin | 710/316 |
| 7,363,417 B1 | 4/2008 | Ngai | |
| 2004/0088469 A1 | 5/2004 | Levy | |
| 2005/0088445 A1 | 4/2005 | Gonzalez et al. | |
| 2005/0235083 A1 | 10/2005 | Tsushima et al. | |
| 2005/0240703 A1 | 10/2005 | Nguyen et al. | |
| 2005/0270298 A1 | 12/2005 | Thieret | |
| 2006/0098020 A1 | 5/2006 | Shen et al. | |
| 2006/0112210 A1 * | 5/2006 | Tseng | 710/307 |
| 2006/0271713 A1 | 11/2006 | Xie et al. | |

OTHER PUBLICATIONS

PCI Express Base Specification, Revision 1.1, Mar. 28, 2005, pp. 161-230.

* cited by examiner

*Primary Examiner* — Mark Rinehart
*Assistant Examiner* — Nimesh G Patel
(74) *Attorney, Agent, or Firm* — Vedder Price P.C.

(57) ABSTRACT

A computing device that allows for a flexible allocation of bandwidth among peripheral devices using a peripheral bus is disclosed. The computing device includes a peripheral bus and at least two slots. The computing device may be used with a single peripheral card or multiple peripheral cards. In a multi-card configuration the invention allows the bandwidth on the peripheral bus to be shared by all the cards. In a single-card configuration, the computing device allows available bandwidth on the peripheral bus to be used by a single card. The device is particularly useful with PCI express compliant expansion cards, such as graphics adapters.

15 Claims, 4 Drawing Sheets

COMPUTING DEVICE WITH FLEXIBLY CONFIGURABLE EXPANSION SLOTS AND METHOD OF OPERATION

CROSS-REFERENCE TO RELATED APPLICATIONS

This application is a continuation of U.S. patent application Ser. No. 11/140,040 filed May 27, 2005, the contents of which are hereby incorporated herein by reference.

FIELD OF THE INVENTION

The present invention relates generally computing devices and more particularly to computing devices including flexibly configurable expansion slots.

BACKGROUND OF THE INVENTION

Computing devices are ubiquitous in our daily lives. Personal computers are good examples as they are used in a variety of daily activities from routine word processing tasks to running complex mission-critical business applications. The use of peripheral input and output (I/O) devices has considerably expanded the usefulness of PCs. Printing documents, sharing storage media and other resources across a network, recording audio, playing music and streaming video are now all fairly common activities that take place on the PC. This has been made possible by the use of graphics cards, sound cards, and network interface cards that are added to the PC by way of expansion slots.

Not surprisingly, peripheral devices constitute a major subsystem of the modern PC. Modern PC architectures include a processing subsystem, peripheral interface circuits and peripheral devices. The processing subsystem includes one or more processors, system memory, and devices with low-latency requirements such as graphics cards, which often require privileged access to system memory. The peripheral interface circuits act as a bridge allowing peripheral devices to communicate with the processing subsystem.

The peripheral interface circuits typically support several interface buses to communicate with peripheral devices, added by way of expansion slots. In a typical architecture, peripheral interface circuits can be further subdivided into a high speed bus interface (often referred to as a "north-bridge" or "root complex") that interfaces with the processor, memory and graphics; and an I/O interface (often referred to as a "south-bridge") that communicates with lower speed peripheral I/O devices using a variety of peripheral buses.

To allow interoperability of peripheral devices, peripheral busses adhere to agreed-upon standards that define the physical and logical requirements of any interface and bus used to connect the peripherals. Over time, many such peripheral bus standards have been devised. These include ISA, EISA, PCI (Peripheral Component Interconnect), PCI-X, and the AGP bus. Each new standard strives to address bandwidth limitations of earlier standards.

The recently introduced PCI Express (PCIe) bus offers a higher bi-directional bandwidth to meet the demands of modern peripherals, such as graphics adapters operable to present real-time video, and 3D graphics. The PCIe standard is detailed in "PCI Express Base Specification. Revision 1.0a" which is available through the PCI Special Interest Group (PCI SIG) and is hereby incorporated by reference.

A particularly useful feature of the PCIe bus is the ability of peripheral devices added by way of an expansion slot to utilize some or all of the available data lines extending to an interface slot. That is, unlike earlier bus standards, such as the PCI bus, where a single fixed width bus was shared by all devices, the PCIe standard defines point to point links between devices in a scalable manner. The PCIe standard defines links consisting of 1, 2, 4, 8, 12, 16 or 32 logical data lines called lanes. A link that is made up of a single data line or lane is called a x1 link; a link with two lanes is a x2 link, and so on. A PCIe device that is capable of using 8 data lines is called x8 capable. The same device may be x1 capable, x2 capable, x4 capable and x8 capable. All devices are required to be x1 capable.

However, because links are point to point and data lines are not shared among expansion slots, unused lanes to any peripheral expansion slot or device typically cannot be used by other devices interconnected with the bus.

Accordingly, there is a need for an improved design that more flexibly allows bus bandwidth sharing among peripheral devices.

SUMMARY OF THE INVENTION

In accordance with the present invention, a computing device includes a peripheral bus and at least two peripheral expansion slots interconnected in a manner that permits a flexible allocation of peripheral bandwidth among the slots depending on whether a single peripheral card or multiple peripheral cards are used.

In accordance with an aspect of the present invention, there is provided a computing device that has a peripheral bus with at least 2n data lines, a first expansion slot and a second expansion slot for receiving a peripheral card using n or 2n data lines. Each slot has a first set of connectors interconnected with n of the 2n data lines and a second set of connectors. Each connector of the second set of the first slot is interconnected to a corresponding connector from the second set of the second slot.

In accordance with another aspect of the present invention, there is provided a computing device that has a peripheral bus with at least 4n data lines, and a first, second, third and fourth expansion slots for receiving peripheral cards. Each of the expansion slots has a first, second, third and fourth set of n connectors. Each first set of n connectors of each slot is connected to n of the data lines. Each of the second set of n connectors of the first slot is connected to a corresponding one of the second set of n connectors of the second slot. Each of the third set of n connectors of the first slot is connected to a corresponding one of the third set of n connectors of the third slot. Each of the fourth set of n connectors of the first slot is connected to a corresponding one of the fourth set of n connectors of the fourth slot.

In accordance with another aspect of the present invention, there is provided a method of operating a computing device that has a peripheral bus with at least 2n data lines, and a first and second expansion slots for receiving a peripheral card using n or 2n data lines. Each slot has a first set of connectors interconnected with n of the 2n data lines and a second set of connectors. The method includes bridging each of the second set of n connectors of the first slot for interconnection with a corresponding one from the first set of n connectors of the second slot.

In accordance with another aspect of the present invention, there is provided a method of operating a computing device that has a peripheral bus with at least 2n data lines, and a first and second expansion slots for receiving a peripheral card using n or 2n data lines. Each slot has a first set of connectors interconnected with n of the 2n data lines and a second set of connectors. The method includes sequentially initializing peripheral expansion cards in the first and second expansion slots so that each card uses n of the 2n data lines.

In accordance with another aspect of the present invention, there is provided a method of operating a computing device that has a peripheral bus with at least 2n data lines, and a first and second expansion slots for receiving a peripheral card using n or 2n data lines. Each slot has a first set of connectors interconnected with n of the 2n data lines and a second set of connectors. The second set of n connectors of the first slot is interconnected with the second set of n connectors of the second slot. The method includes disconnecting the second set of n connectors of the first slot from the second set of n connectors of the second slot, and initializing peripheral expansion cards in the first and second slots.

In accordance with another aspect of the present invention, there is provided a connector card for insertion into a peripheral expansion slot having 2n connectors. The connector card has an edge connector that includes a first and second set of n terminals. Each terminal is used for interconnection with one of the connectors on the card. Each terminal in the first set is interconnected to a corresponding terminal in the second set.

In accordance with an aspect of the present invention, there is provided a motherboard operable in first and second modes of operation. The motherboard includes a bus interface interconnected with a peripheral bus that has at least 2n data lines. The motherboard also has a first expansion slot and a second expansion slot for receiving a peripheral card using n or 2n data lines. The first slot has a first set of n connectors interconnected with n of the 2n data lines, and a second set of n connectors. The second slot has a set of connectors interconnected with another n of the 2n data lines. In the first mode of operation, the second set of n connectors of the first slot is disconnected from the data lines. In the second mode of operation, the second set of n connectors of the first slot is connected with n of the 2n data lines that are not connected to the first set of connectors of the first slot.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
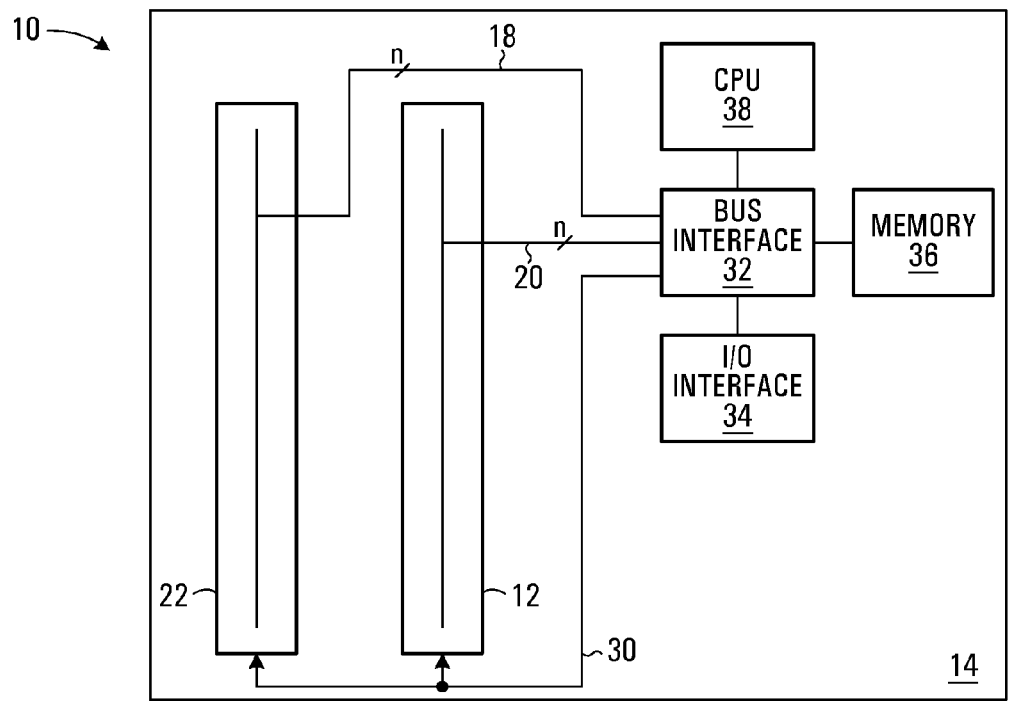
FIG. 1 is a schematic diagram of a conventional computing device having a PCIe peripheral expansion bus and two PCIe compliant expansion slots.

A conventional computing device 10 including a peripheral expansion bus and two expansion slots is depicted in FIG. 1. Device 10 includes central processor 38, in communication with high speed bus interface circuit 32, I/O interface 34, and memory 36, all on a motherboard 14. Bus interface circuit 32 provides an interface from the processor 38 to expansion slots 12, 22. Each expansion slot 12, 22 is connected to the bus interface circuit 32 by traces 18 and 20, respectively, defining eight independent point-to-point lines or lanes to each expansion slot 12, 22.

Processor 38 may be an Intel Pentium class processor. Bus interface circuit 32 and slots 12, 22 and the interconnecting bus are compliant with the PCIe requirements set out in "PCI Express Base Specification. Revision 1.0a", referred to above. Each slot 12, 22 is sized to receive a PCIe compliant expansion card to allow it to interface with processor 38 over the PCIe compliant bus. Memory 36 stores processor executable instructions executable by processor 38, including basic input/output system (BIOS) code used by processor 38 to initialize operation of computing device 10.

Each exemplified data line or lane is a logical construct that may be made up of one or more physical traces to bus interface circuit 32. In the case of PCIe, a lane is bi-directional, and differential signals are used in both transmit and receive directions. Four physical connections are used to realize a single data lane; two for the differential transmit pair and two for the differential receive pair.

Bus interface circuit 32 is a 16-lane PCIe bus interface. Each slot 12, 22 has 8-lanes which are independently routed to bus interface circuit 32. First slot 12 has 8-lanes connected to bus interface circuit 32 by traces 20. Second slot 22 also has 8-lanes connected to bus interface circuit 32 by traces 18.

Further, a reset line 30 is common to both slot 12 and slot 22. As a consequence, peripheral expansion cards in either both slots 12 and 22 are in reset state or both are out of reset state.

Device 10 may be used with two independent 8-lane PCIe expansion cards. To this end, one expansion card is inserted in each slot 12, 22. Line 30 is driven to reset, causing the PCIe compliant interface of each card in slot 12, 22 to attempt to negotiate a link with the bus interface circuit 32.

Link initialization and training is more particularly described in the "PCI Express Base Specification. Revision 1.0a" referred to earlier. Briefly, link initialization and training involves detecting a corresponding PCIe interface receiver at the other end, deciding on lane polarity, determining the number of lanes to use, determining lane data rate and establishing other parameters that would characterize the link. Each card transitions through a series of states to establish a link. The sequence of major states is typically detection-state, polling-state, configuration-state, and the L0-state if no abnormalities are encountered. Normal application data transfer occurs in the L0-state. These states together with a few other states constitute the 'link training and status state machine' (LTSSM). During training, physical layer packets called "ordered sets" are exchanged between two interfaces at each end of a link. Two of these ordered sets called "training sequence 1" (TS1) and "training sequence 2" (TS2) are used to determine link speed and the number of lanes used for the link. The bus interface circuit 32 and a card establish a link between them independently of processor 38. Processor 38 is not involved in the actual link initialization process although it may configure the bus interface circuit 32 prior to training.

Interface circuit 32 may control the reset line 30. When the reset line 30 is released, both cards in slot 12 and slot 22 enter their detect-state. Once the card in slot 12 is in detect-state, it performs receiver detection on its 8-lanes and proceeds to train to bus interface circuit 32 using traces 20. Concurrently, the card in slot 22 also performs receiver detection on its 8-lanes and trains to bus interface circuit 32 using traces 18. Each PCIe card undergoes the state-transition sequence of detect-state then polling-state then configuration-state and finally L0-state if no errors are encountered. In the absence of errors, each card will establish an 8-lane link for operation.

Now, a 16-lane card cannot establish a 16-lane link if each slot has only 8-lanes routed to the bus interface circuit 32. That is, a single 16-lane PCIe card that is x8 capable, placed in a slot 12 or 22 would only be able to use the lower 8-lanes. Its upper 8-lanes would not be connected the interface circuit 32. This poses a very serious limitation. A 16-lane card would have to be used in 8-lane mode—operating at only half of the potentially available bandwidth.

Figure 2:
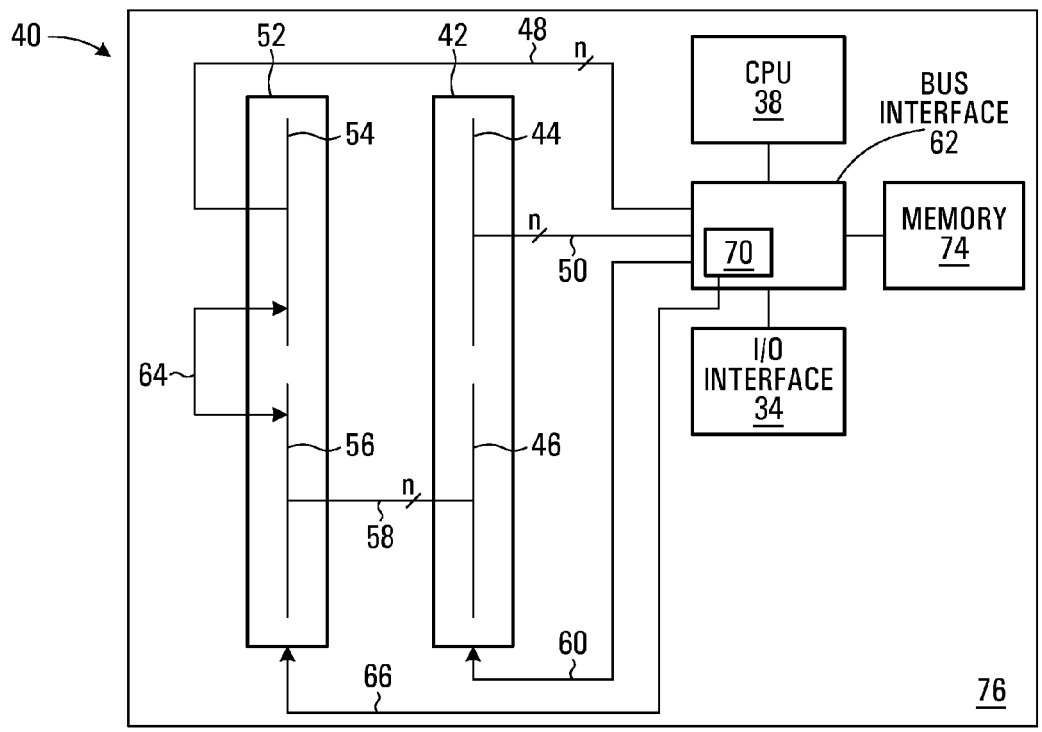
FIG. 2 is a schematic diagram of a computing device exemplary of an embodiment of the present invention, including two 16-lane PCIe compliant expansion slots.

FIG. 2 accordingly depicts a computing device 40 exemplary of an embodiment of the present invention. It overcomes the bandwidth limitation associated with the use of a single card identified above, by allowing lanes interconnected to the bus to be interconnected to a single slot or multiple slots.

As illustrated, computing device 40 includes a central processor 68, memory 74, I/O bridge 72, first and second expansion slots 42 and 52, high speed bus interface circuit 62, and a control circuit 70, all on a motherboard 76. Traces interconnect the various components. First slot 42 is a 16-lane PCIe compliant slot that has eight lower lanes 44 and eight upper lanes 46. Similarly, second slot 52 is a 16-lane PCIe compliant slot that has eight lower lanes 54 and eight upper lanes 56. Traces 50 further connect the eight lower lanes 44 of slot 42 to interface circuit 62 in much the same way as traces 20 connect slot 12 (FIG. 1) to interface circuit 32. Traces 48 connect the eight lower lanes 54 of second slot 52 to interface circuit 62.

Without further interconnection, slots 42 and 52 could physically accommodate an 8-lane PCIe device, or a 16-lane PCIe device, operating in x8 mode.

However, additional traces 58 connect the eight upper lanes 46 of slot 42, to the corresponding eight upper lanes 56 of slot 52. Further, independent reset lines 60 and 66 are connected to slots 42 and 52, respectively. Notably, unlike in FIG. 1, a single reset line is not common to both slots 42 and 52.

Reset line 60 is controlled by interface circuit 62, in much the same manner as reset line 30 is controlled by interface circuit 32. A separate control circuit 70 controls the reset line 66 to slot 52.

Now, computing device 40 can be used with conventional PCIe expansion cards that are 8-lanes wide, as the PCIe specification allows x8 cards to be inserted in x16 slots. The cards are inserted in slots 42 and 52 so that they utilize the lower lanes 44, 54 of each slot 42, 52. Each card will form an 8-lane wide link upon initialization and training and the cards can work in parallel, in a conventional manner.

In an enhanced mode of operation, one of slots 42 or 52 may alternatively be used to establish a 16-lane link between a x16 capable PCIe compliant card and the interface circuit 62 of computing device 40. In order to allow this, the x16 card is inserted in slot 42 and a connector card 64 is placed in slot 52. Connector card 64 interconnects each of the lower eight lanes of slot 52 with one of the upper eight lanes of slot 52.

Figure 3A:
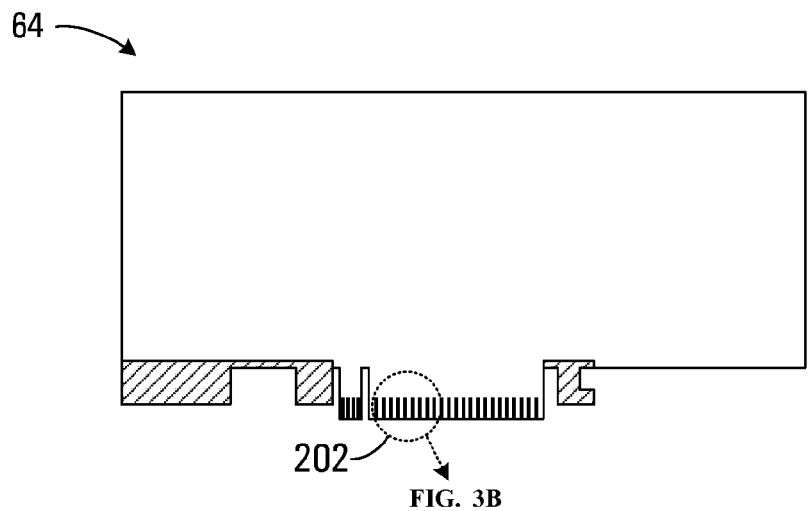
FIG. 3A is schematic diagram of a PCIe connector card used in the computing device of FIG. 2.
Figure 3B:
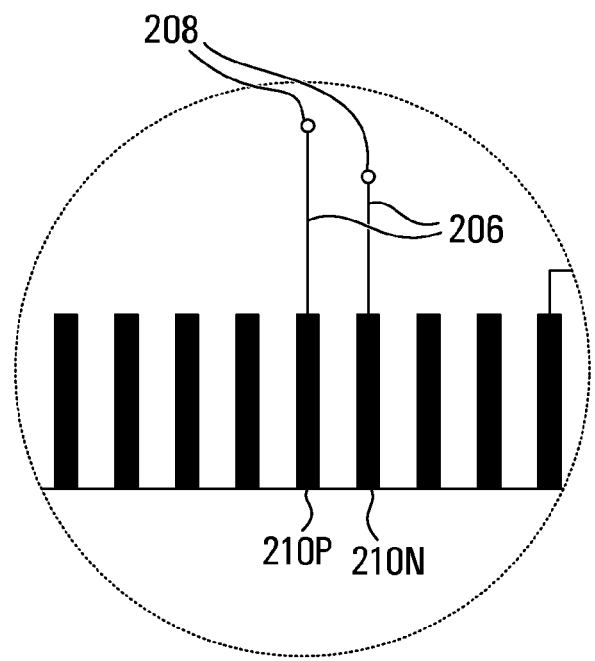
FIG. 3B is an enlarged view of a portion of the schematic diagram of FIG. 3A.

FIG. 3A illustrates one side of connector card 64. Connector card 64 typically contains traces, wires and passive components. When connector card 64 is placed in slot 52, card 64 connects each of the lower lanes 54 of slot 52 to one of the upper lanes 56. FIG. 3B is an enlarged view of a section of card 64 outlined by 202 in FIG. 3A. The differential transmit signal pair of the first lane are shown as 210P, and 210N. Traces 206 are used to route the signals on the card. In a PCIe compliant card, transmit pairs are on one side of the edge connector of the card while all receive pairs are on the opposite side. At a suitable point, traces 206 are routed to the opposite side of the card using for example metal vias 208 and connected to the appropriate receive differential pairs. Connector card 64 interconnects the differential signals of each lane on one side of card 64 to the differential signals of another lane on the opposite side as described below.

Order is maintained, so the most significant of the lower 8-lanes is coupled to the most significant of the upper lanes; the least significant of the lower 8-lanes is similarly coupled to the least significant of the upper 8-lanes. As noted, for PCIe lanes, four physical connections are used per lane: two for the differential transmit pair and two more for the differential receive pair. To illustrate more clearly, let the lanes of the x16 slot, ordered from the lowest to the highest be labeled as lane0, lane1, . . . , lane15. Let the differential transmit signals of a x16 slot be $(T_{x0}+, T_{x0}-)$ for lane0, $(T_{x1}+, T_{x1}-)$ for lane1, . . . , $(T_{x15}+, T_{x15}-)$ for lane15. Similarly let the differential receive signals of the lane0, lane1, . . . , lane15 be referred to as $(R_{x0}+, R_{x0}-), (R_{x1}+, R_{x1}-), \ldots, (Rx_{15}+, Rx_{15}-)$ respectively. To couple lane0 with lane8, connector card 64 would make four electrical connections, namely $T_{x0}+$ with $R_{x8}-$, $T_{x0-}$ with $R_{x8}+$, $R_{x0}+$ with $T_{x8}-$ and $R_{x0}-$ with $T_{x8}+$. Similarly, to couple lane1 with lane9, connector card 64 connects $T_{x1}+$ with $R_{x9}-$, $T_{x1}-$ with $R_{x9}+$, $R_{x1}+$ with $T_{x9}-$, and $R_{x1}-$ with $T_{x9}+$. The same connection pattern holds for any two lanes that are coupled by connector card 64. It should be appreciated that the polarities of the signals are inverted for the connections just described. This is permissible since the PCI express specification allows lane polarity inversion. Accordingly, in FIG. 3B, positive transmit signal 210P of the first lane (lane0) would be coupled to the negative receive signal (not shown) of the ninth lane (lane8) on the opposite side of the card. Negative transmit signal 210N of the first lane would similarly be coupled with the positive receive signal of the ninth lane (not shown) on the opposite side of connector card 64. The differential pairs may be alternately interconnected if lane polarity is not desired.

In FIG. 2, connector card 64 interconnects the lanes in slot 52 such that lane0 couples lane8, lane1 couples lane9, lane2 couples lane10 and so on, with lane7 coupling lane15. This ensures that an 8-lane electrical path exits from upper lanes 46 of slot 42 all the way to interface circuit 62 through traces 58, connector card 64 and traces 48. Thus, in the presence of connector card 64 in slot 52, all 6-lanes of interface circuit 62 are effectively routed to slot 42.

Conveniently, a x16 PCIe card in slot 42 can now negotiate a 16-lane link, and thus use the full bandwidth available between interface circuit 62 and slots 42, 52. As should now be appreciated, slots 42 and 52 may be used with two conventional eight-lane PCIe cards or one conventional sixteen-lane PCIe card.

However, multiple x16 PCIe cards installed in slots 42 and 52 may experience link initialization problems, even when each card is capable of operating in 8-lane mode. For example, to use computing device 40 with two x16 cards (that are x8 capable), the first x16 capable card is placed in slot 42, and the second card in slot 52. If the cards are reset concurrently, both cards will exit their reset state simultaneously just as in device 10 (FIG. 1). However, if both cards simultaneously attempt PCIe link initialization and training as described above, they will fail to configure properly as 8-lane devices. The card in slot 42 will perform receiver detection on all of its 16-lanes, because its lower lanes 44 are connected to the interface circuit while its upper lanes 46 are connected to the card in slot 52. Similarly, the card in slot 52 will also perform receiver detection on all of its 16-lanes, because its lower lanes 54 are connected to the interface circuit and its upper lanes 56 are connected to the card in slot 42. Each card's state machine (LTSSM) transitions from detect-state to polling-state. The polling-state however, requires a set of conditions, including the requirement that all lanes that detected a receiver must receive an ordered TS1/TS2 set at least once, to proceed to the next state, as detailed above. Neither card will meet this condition, as the upper lanes of each card will not receive the required TS1/TS2 ordered sets. Thus the cards cannot proceed to establish an 8-lane link with the interface circuit 62 as desired.

Accordingly, control circuit 70 resets card in slot 52, only after interface circuit 62 has reset the card in slot 42, to avoid their concurrent initialization. Control circuit 70 may be part of bus interface circuit 32. Alternatively, control circuit 70 can, for example, be a GPIO circuit under control of processor 68. Control circuit 70 asserts reset line 66 until a signal is received from processor 68 indicating that the card in slot 42 is initialized. During the start-up of computing device 40, BIOS code may cause processor 68 to signal control circuit 70 to release any card in slot 52, from its reset state only after a card in slot 42 has been initialized. Processor 38 under BIOS control can inspect a link status register in the interface circuit 32 to ascertain that link training is completed.

Specifically, upon start-up of computing device 40, and in the presence of x16 cards in slots 42 and 52, the card in slot 42 performs link initialization as described above. Upper lanes 46 of the card in slot 42 will not detect a PCIe compliant interface, as the card in slot 52 to which they are connected, is still in reset state. The card therefore presents to the interface circuit, a high impedance termination on the upper lanes. The card in slot 42 thus proceeds to successfully train in 8-lane mode.

Once card 42 is trained in 8-lane mode, processor 68 under BIOS control disables the upper lanes 46 of the card in slot 42. To disable upper lanes 46, processor 68 may for example instruct the card in slot 42 to turn off or disconnect its upper lanes' termination using its internal configuration registers. Accordingly the card in slot 42 should include device electronics allowing any receiver termination connected to upper lanes 46 to be disabled or disconnected, without disabling their lower lanes.

Next, processor 68 instructs control circuit 70 to enable the card in slot 52, by releasing reset line 66. Once enabled, the card in slot 52 begins receiver detection. As a result, the card will detect the interface circuit 62 on its eight lower lanes 54. Upper lanes 56 will not detect a PCIe interface since the upper lanes 46, to which they are connected are now turned off. Thus, the card in slot 52 will also proceed to train in 8-lane mode with the interface circuit. After successful initialization and training, which would be indicated by a link status register in the interface circuit 62, the processor instructs the card in slot 52 to turn off upper lanes 56. The system is then configured as a dual slot board by the BIOS and the device driver can proceed with data transmission and reception using both cards.

As just described, computing device 40 allows two PCIe compliant cards, with two independent 8-lane links to the interface circuit, to be used together. The two cards may for example be graphics adapters including a graphics processing unit, capable of rendering 3D graphics. The two cards, in combination may provide a powerful parallel 3D display. Similarly, a single 16-lane PCIe graphics card utilizing all 16 lanes to form a single link to the interface circuit 62 can also be used in the same device 40.

Figure 4:
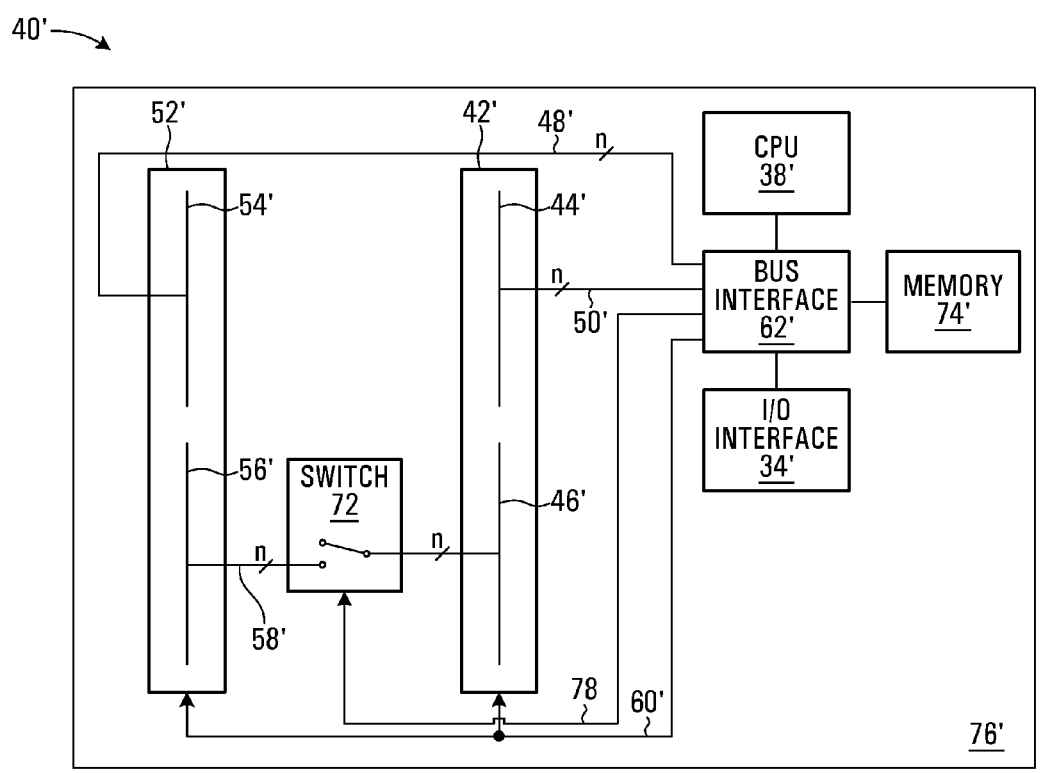
FIG. 4 is a schematic diagram of a computing device exemplary of another embodiment of the present invention, including two 16-lane PCIe compliant expansion slots.

As should now be apparent, connector card 64 serves to bridge or connect upper 8-lanes 54 of slot 52 to slot 42 when motherboard 76 is operated in a first mode of operation, allowing use of a 16-lane card in slot 42. In a second mode of operation, use of a 16-lane card in slot 42 and the independent reset of a card in slot card 42 followed by its programming to disable or disconnect upper 8-lanes of the card, serves to physically disconnect or logically disconnect (i.e. disable) the upper eight lanes of the card in slot 42. This second mode of operation could alternatively be achieved by otherwise physically disconnecting the upper lanes of slot 42. Thus, in an alternate embodiment depicted in FIG. 4, upper eight lanes connecting slot 42' are interconnected with a bus switch 72 on motherboard 76'. Motherboard 76' shares many components that are substantially the same as those used on motherboard 76 (FIG. 2). These components are not described, but instead labelled with a prime symbol ('). Bus switch 72 connects or disconnects all upper 8-lanes of slot 42'. Bus switch 72 thus controls whether or not the upper 8-lanes of a card in slot 42' are physically connected with bus interface 62' or slot 52'. Closing bus switch 72, in conjunction with a connector card 64 in slot 52' again interconnects all 16-lanes of bus interface 62' with slot 42'. Opening bus switch 72 ensures that only the lower eight lanes of slot 42 are connected with bus interface circuit 62. Conveniently, if bus switch 72 is open, reset and link initialization of cards in slots 42' and 52' can be performed concurrently. Control circuit 70 (FIG. 2) may thus be eliminated. Bus switch 72 can be controlled by processor 38' under control of software in memory 74', by way of control line 78.

Figure 5:
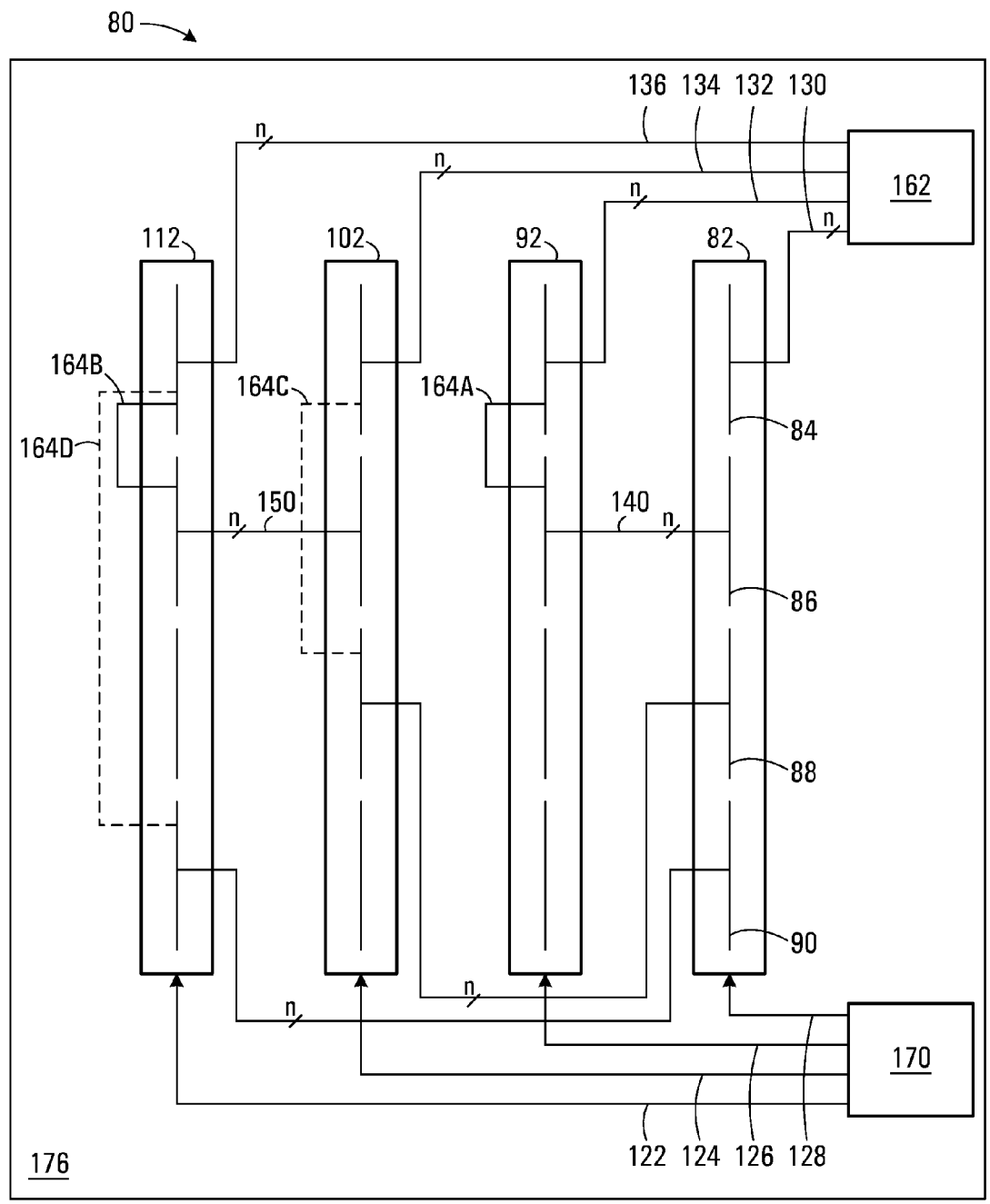
FIG. 5 is a schematic diagram of a computing device exemplary of another embodiment of the present invention, including four 16-lane PCIe compliant expansion slots.

As will now also be apparent to those skilled in the art the invention can easily be adapted to a computing device with more than two slots. For example, a device with a PCIe motherboard, with four 16-lane slots and an interface circuit that is capable of training to four cards in 4-lane mode is shown in FIG. 5. This computing device 80 can also be used with a single 16-lane card. The same device can be used with two x8 capable cards. Moreover the same device can be used with four x4 capable cards. The device is described below.

For convenient reference, let the lowest lane in each slot be labeled as lane0, the next lowest as lane1, . . . and so on, with the uppermost lane labeled as lane15. In the embodiment shown in FIG. 5, the lanes that are routed to the interface circuit are lane0, lane1, lane2, and lane3 of each slot. Traces 140 couple lane4, lane5, lane6 and lane7 of the slot 82 to lane4, lane5, lane6 and lane7 of slot 92. Traces 150 couple lane4, lane5, lane6 and lane7 of slot 102 to lane4, lane5, lane6 and lane7 of slot 112. Slot 102 has its lane8, lane9, lane10 and lane11 connected to lane8, lane9, lane10 and lane11 of slot 82 respectively via traces 142. Traces 144 connect lane12, lane13, lane14, and lane15 of slot 112, to lane12, lane13, lane14, and lane15 of slot 82 respectively.

To use device 80 with a single x16 card, the card is placed in slot 82. The other slots will each have connector cards or connector cards placed in them. Connector cards 164A, 164C and 164D are placed in slot 92, slot 102 and slot 112 respectively. Connector card 164A connects lane0, lane1, lane2, and lane3 of slot 92 with lane4, lane5, lane6 and lane7 of slot 92 respectively. Connector card 164C in slot 102 connects lane0, lane1, lane2, and lane3 with lane8, lane9, lane10 and lane11 respectively. Card 164D in slot 112 connects lane0, lane1, lane2, and lane3 with lane12, lane13, lane14 and lane15 respectively.

To use all four cards in 4-lane mode, one x4 capable card is installed in each slot. If each card is an x4 card, then each card will detect the interface circuit and train in 4-lane mode. However, if the cards are wider than x4, then the multi-card initialization problem can occur and therefore a control circuit may be used. Assuming the cards are x16 cards, the control circuit 170 toggles reset signals 122, 124, 126, 128 so that when the card in slot 82 is training with the interface circuit 170, the other cards are kept in reset state by asserting signal 122, signal 124 and signal 126. After the card in the slot 82 is trained and the unused lanes of lot 82—lanes 86, lanes 88 and lanes 90—are turned off, the card in slot 92 is allowed to get out of reset state and train with the interface circuit 162. The cards in slot 102 and slot 112 are kept in reset until the card in slot 92 finishes. After training, the card is slot 92 turns off its unused lanes, the card in slot 102 is allowed to train. Finally the card in slot 112 trains to the interface circuit.

The same device 80 can also be used with two x8 or x8 capable cards. Only connector cards 164A and 164B are used in this case. Connector card 164A connects lane0, lane1, lane2, and lane3 of slot 92 with lane4, lane5, lane6 and lane7 of the same slot respectively. Connector card 164B connects lane0, lane1, lane2, and lane3 of slot 112 with lane4, lane5, lane6 and lane7 of the same slot respectively. The x8 cards are placed in slot 82 and slot 102. Upon initialization and training, each card will have an 8-lane link to the interface circuit. If the cards are wider than x8, then the control circuit 170 will have be used as described earlier to keep one card in reset state while the other card is training.

As should be appreciated, in general the present invention may be adapted for use with a computing device that has N peripheral expansion slots, each of the N slots being S-lanes wide, and an S-lane interface circuit capable of training with multiple devices in W-lane mode where S=N×W. In the typical exemplary embodiment discussed in detail earlier and shown in FIG. 2, these values are N=2, W=8 and S=16.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A computing device, comprising:
   a peripheral bus having at least 2n data lines;
   a first expansion slot receiving a first peripheral card comprising 2n data line interconnects, and operable in a first mode using n of said 2n data lines, and in a second mode using 2n of said 2n data lines, said first expansion slot comprising a first set of n connectors, interconnected with n of said 2n data lines, and a second set of n connectors; and said first peripheral card configurable to disable use of n of said 2n data lines interconnected with said second set of n connectors of said first expansion slot when said first peripheral card is operating in said first mode;
   a second expansion slot receiving a second peripheral card comprising 2n data line interconnects, and operable in a first mode using n of said 2n data lines, and in a second mode using 2n of said 2n data lines, said second expansion slot comprising a first set of n connectors, interconnected with n further ones of said 2n data lines, and a second set of n connectors, wherein each of said second set of n connectors of said first expansion slot is interconnected to a corresponding one of said second set of n connectors of said second expansion slot;
   reset control lines for resetting said first and second peripheral cards in said first and second expansion slots, independently;
   a reset control circuit operable to initialize said first peripheral card in said first expansion slot, without concurrently initializing said second peripheral card in said second slot; and to reset said second peripheral card in said second expansion slot, after initialization of said first peripheral card in said first expansion slot, to train each of said first and second peripheral cards to operate in their first mode, each using n of said 2n data lines.

2. The computing device of claim 1, wherein said peripheral bus is a PCI express compliant expansion bus.

3. The computing device of claim 1, wherein said computing device comprises a motherboard, and each of said second set of n connectors of said first expansion slot is interconnected to a corresponding one of said second set of n connectors of said second slot by traces on said motherboard.

4. The computing device of claim 1, wherein said reset control circuit is operable to assert a reset line of said second peripheral card as said first peripheral card is initializing to prevent said second peripheral card from initializing concurrently with said first peripheral card.

5. The computing device of claim 1, wherein said second peripheral card in said second expansion slot presents high impedance termination to said second set of n connectors of said second expansion slot, when said first peripheral card in said first expansion slot is being initialized.

6. The computing device of claim 1, wherein said first peripheral card in said first expansion slot presents high impedance termination to said second set of n connectors of said first expansion slot, when said second peripheral card in said second expansion slot is being initialized.

7. The computing device of claim 1, wherein said first peripheral card in first expansion slot presents high impedance termination to said second set of n connectors of said first expansion slot after said disabling.

8. A method of operating a computing device comprising a peripheral bus having at least 2n data lines; a first expansion slot for receiving peripheral cards comprising 2n data line interconnects, and operable in a first mode using n of said 2n data lines, and in a second mode using 2n of said 2n data lines, said first expansion slot comprising a first set of n connectors, interconnected with n of said 2n data lines and a second set of n connectors; a second expansion slot for receiving peripheral cards comprising 2n data line interconnects, and operable in a first mode using n of said 2n data lines, and in a second mode using 2n of said 2n data lines, said second expansion slot comprising a first set of n connectors, interconnected with n further ones of said 2n data lines and a second set of n connectors; wherein each of the second set of n connectors of the first expansion slot is interconnected with one of the second set of n connectors of said second expansion slot; said method comprising:
   initializing said first of said peripheral cards in said first slot to operate in its first mode to use n of said 2n data lines interconnected with the first set of n connectors of said first expansion slot;
   configuring said first peripheral card to disable use of n of said 2n data lines interconnected with the second set of n connectors of said first expansion slot, after said first peripheral card has been initialized;
   initializing said second of said peripheral cards in said second expansion slot, to operate in its first mode to use n of said 2n data lines interconnected with the first set of n connectors of said second expansion slot.

9. The method of claim 8, wherein said peripheral bus is a PCI express compliant bus.

10. The method of claim 8, wherein at least one of said first and second peripheral cards is a graphics adapter.

11. The method of claim 8, further comprising operating a reset circuit to reset said peripheral card in said second expansion slot after said disabling.

12. The method of claim 8, further comprising asserting a reset line of said second peripheral card as said first peripheral card is initializing to prevent said second peripheral card from initializing as said first peripheral card is initializing.

13. The method of claim 8, wherein said second peripheral card in said second expansion slot presents high impedance termination to said second set of n connectors of said second expansion slot, when said first peripheral card in said first expansion slot is being initialized.

14. The method of claim 8, wherein said first peripheral card in said first expansion slot presents high impedance termination to said second set of n connectors of said first expansion slot, when said second peripheral card in said second expansion slot is being initialized.

15. The method of claim 8, wherein said first peripheral card in first expansion slot presents high impedance termination to said second set of n connectors of said first expansion slot after said disabling.

* * * * *